US011375666B2

(12) United States Patent
Baes et al.

(10) Patent No.: US 11,375,666 B2
(45) Date of Patent: Jul. 5, 2022

(54) CORN HEADER ADJUSTABLE DIVIDER POINT

(71) Applicant: CNH Industrial America LLC, New Holland, PA (US)

(72) Inventors: Frederik Baes, Reninge (BE); Stijn Borry, Pittem (BE); Yvan C. C. Vandergucht, Lo-Reninge (BE); Maarten Ysebaert, Tielt (BE)

(73) Assignee: CNH Industrial America LLC, New Holland, PA (US)

(*) Notice: Subject to any disclaimer, the term of this patent is extended or adjusted under 35 U.S.C. 154(b) by 181 days.

(21) Appl. No.: 16/478,783

(22) PCT Filed: Jan. 15, 2018

(86) PCT No.: PCT/EP2018/050881
§ 371 (c)(1),
(2) Date: Jul. 17, 2019

(87) PCT Pub. No.: WO2018/134155
PCT Pub. Date: Jul. 26, 2018

(65) Prior Publication Data
US 2020/0053964 A1    Feb. 20, 2020

(30) Foreign Application Priority Data
Jan. 17, 2017   (BE) .................................. 2017/5026

(51) Int. Cl.
*A01D 63/00*     (2006.01)
*A01D 45/02*     (2006.01)

(52) U.S. Cl.
CPC ............ *A01D 63/00* (2013.01); *A01D 45/021* (2013.01)

(58) Field of Classification Search
CPC ........ A01D 63/00; A01D 63/02; A01D 63/04; A01D 45/021; A01D 45/02; A01D 46/08;
(Continued)

(56) References Cited

U.S. PATENT DOCUMENTS

| 18,983 | A | * | 12/1857 | Marcellus | ............... | A01D 63/02 |
| | | | | | | 56/317 |
| 19,904 | A | * | 4/1858 | Beach | .................... | A01D 63/02 |
| | | | | | | 56/315 |

(Continued)

FOREIGN PATENT DOCUMENTS

| DE | 2807822 A1 * | 9/1978 | ............. A01D 65/00 |
| DE | 3614724 A1 | 11/1987 | |

(Continued)

OTHER PUBLICATIONS

PCT International Search Report for PCT application PCT/EP2018/050881, dated May 9, 2018 (12 pages).

*Primary Examiner* — Alicia Torres
*Assistant Examiner* — Madeline I Runco
(74) *Attorney, Agent, or Firm* — Peter Zacharias; Patrick Sheldrake

(57) ABSTRACT

A corn head assembly for an agricultural harvester includes a plurality of row units for processing corn plants in rows. Adjustable dividers are provided between adjacent row units to direct laterally adjacent corn plants into adjacent row units. Each adjustable divider has an adjustable divider point with an adjustable operating height profile between a shorter, lowermost position and a taller, uppermost position to adjust the operating height of the adjustable divider for different harvesting conditions.

13 Claims, 3 Drawing Sheets

(58) Field of Classification Search
CPC ........ A01D 46/10; A01D 45/00; A01D 65/00;
A01D 43/081; A01D 43/082
See application file for complete search history.

(56) References Cited

U.S. PATENT DOCUMENTS

| | | | | |
|---|---|---|---|---|
| 32,197 A * | 4/1861 | Manny | A01D 57/24 | 56/318 |
| 125,198 A * | 4/1872 | Keller et al. | A01D 63/02 | 56/317 |
| 365,771 A * | 7/1887 | Bachman | A01D 63/04 | 56/314 |
| 446,316 A * | 2/1891 | Anthony | A01D 63/04 | 56/314 |
| 703,497 A * | 7/1902 | Steward | A01D 63/04 | 56/319 |
| 760,743 A * | 5/1904 | Kennedy et al. | A01D 63/04 | 56/319 |
| 1,302,768 A * | 5/1919 | Crane | A01D 63/04 | 56/319 |
| 1,755,506 A | 4/1930 | Jackson | | |
| 1,859,208 A * | 5/1932 | Kane | A01D 63/04 | 56/319 |
| 2,044,396 A * | 6/1936 | Perau | A01D 45/22 | 56/312 |
| 2,209,047 A * | 7/1940 | Berg | A01D 63/04 | 56/319 |
| 2,473,978 A * | 6/1949 | Van Buskirk | A01D 63/04 | 56/15.9 |
| 2,534,481 A * | 12/1950 | Spraker | A01D 45/021 | 56/119 |
| 3,035,390 A * | 5/1962 | Karlsson | A01D 45/021 | 56/119 |
| 3,765,157 A * | 10/1973 | Hyman | A01D 45/021 | 56/119 |
| 3,995,412 A * | 12/1976 | Gaeddert | A01D 45/021 | 56/98 |
| 4,199,927 A * | 4/1980 | Craig | A01D 57/02 | 56/1 |
| 4,300,335 A * | 11/1981 | Anderson | A01D 45/021 | 56/119 |
| 4,446,682 A * | 5/1984 | Jennen | A01D 45/021 | 56/119 |
| 4,493,181 A * | 1/1985 | Glendenning | A01D 65/00 | 56/119 |
| 4,538,404 A * | 9/1985 | Heimark, Jr | A01D 45/021 | 56/119 |
| 4,700,537 A * | 10/1987 | Emmert | A01D 63/04 | 56/119 |
| 4,757,673 A | 7/1988 | Gayman | | |
| 5,444,968 A * | 8/1995 | Barton | A01D 45/021 | 56/119 |
| 5,787,697 A * | 8/1998 | Post | A01D 45/021 | 56/119 |
| 5,960,618 A * | 10/1999 | Kerber | A01D 45/021 | 56/119 |
| 6,247,297 B1 * | 6/2001 | Becker | A01D 45/021 | 56/119 |
| 6,513,313 B1 * | 2/2003 | Bennett | A01D 45/021 | 56/119 |
| 7,240,471 B2 * | 7/2007 | Mossman | A01D 45/021 | 56/109 |
| 8,141,331 B2 * | 3/2012 | Bich | A01D 63/04 | 56/15.2 |
| 9,032,700 B2 * | 5/2015 | Lohrentz | A01D 63/00 | 56/119 |
| 10,159,188 B2 * | 12/2018 | Gessel | A01D 45/021 | |
| 2004/0107685 A1 * | 6/2004 | Resing | A01D 45/021 | 56/119 |
| 2014/0116020 A1 * | 5/2014 | Mossman | A01D 63/04 | 56/314 |
| 2014/0130474 A1 | 5/2014 | Hulstein et al. | | |
| 2015/0121831 A1 * | 5/2015 | Noll | A01D 41/148 | 56/249 |
| 2016/0183466 A1 * | 6/2016 | Long | A01D 45/021 | 56/119 |

FOREIGN PATENT DOCUMENTS

| | | | |
|---|---|---|---|
| EP | 1142467 A1 | 10/2001 | |
| EP | 1186223 A1 | 3/2002 | |
| EP | 1396185 A2 | 3/2004 | |
| EP | 1470748 A2 * | 10/2004 | ............ A01D 63/02 |
| FR | 1364579 A | 6/1964 | |
| GB | 960371 A | 6/1964 | |

* cited by examiner

CORN HEADER ADJUSTABLE DIVIDER POINT

BACKGROUND OF THE INVENTION

The present invention relates to agricultural harvesters such as combine or forage harvesters, more specifically to the header attachments therefor, and still more specifically to the divider points of corn header attachments for agricultural harvesters.

An agricultural harvester known as a "combine" or "combine harvester" is historically termed such because it combines multiple harvesting functions with a single harvesting unit, such as picking, threshing, separating and cleaning. A typical combine is provided with a header which removes the crop from a field, and a feeder housing which transports the crop matter into a threshing and cleaning section where the desirable grain is separated from the undesirable non-grain material. The cleaned grain is transported to an onboard grain storage tank or hopper, and non-grain crop material such as stalks, stems or leaves from the threshing and cleaning section proceeds through a residue system, which may utilize a chopper to process the non-grain material and direct it out the rear of the combine. When the onboard grain storage tank becomes full, the combine is positioned adjacent a vehicle into which the grain is to be unloaded, such as a semi-trailer, gravity box, straight truck, or the like; and an unloading system on the combine is actuated to transfer the grain into the vehicle.

One type of header used for reaping and gathering crop plants, which is well-known to those skilled in the art of combines, is a corn head. The corn head is a specially designed header that is used for stripping ripened corn ears from the plant stalks. The corn head feeds the corn ears to the combine, where the corn is separated from the cob and the husks.

Typically, corn is planted in crop fields in a number of parallel rows, which can vary spacing width between rows. A corn head for harvesting the crop, therefore, includes a number of individual row units that are spaced apart along the width of the corn head by a corresponding distance so that each row unit operates on a separate row of corn. Corn heads are available in a number of configurations, commonly ranging between four row units and twenty-four row units in width.

The row units of a corn head perform the critical task of stripping the corn ears from the stalks so that the corn ears can be processed in the combine. To accomplish this task, a narrow opening is provided that extends between two stripper plates. The narrow opening is wide enough to allow the cornstalks to travel freely through the length of the opening but is narrower than the diameter of the corn ears so that the corn ears cannot travel through the length of the opening. Also provided is a set of stalk rolls which are installed under the narrow opening, with one stalk roll positioned on each side of the opening. Each of the stalk rolls includes a cylindrical body with spiral vanes that extend outwardly from the cylinder surface. The stalk rolls rotate around an approximately horizontal axis which is in a plane parallel to the corn rows and the narrow opening. When the corn plants enter the front end of the narrow opening, the rotating spiral vanes of the stalk rollers grab the cornstalks and pull the stalks downward. As the cornstalks are pulled down through the narrow opening, the wider corn ears are stripped from the stalk by the stripper plates. Gathering devices gather and feed the stripped corn ears toward a gathering conveyor and into the combine.

One problem with this method of stripping corn ears from the stalks is the difficulty for the combine operator to direct the combine accurately and align the narrow opening to receive the row of corn. Any variations in stalk positions within the row or growth angle of the stalks can make alignment even more difficult. Accordingly, it is known to provide a funneling chamber ahead of the opening to direct the corn plants properly into the corn head even when the stalks are not precisely aligned with the opening. A divider, which may be referred to generally as a snout, extends forward from the sides of the opening. The divider may be made from sheet metal or plastic in a shape that is narrow and low at the front and expands in width and height to a broader and taller configuration at the rear of the divider, near the stalk opening. Each divider provides a barrier between adjacent corn rows and extends forward from the row unit and travels between the rows of corn as the combine moves along the rows of corn. As the individual corn plants in the rows of corn plants contact the sides of a divider, the corn plants are redirected towards the narrow opening in a funnel-like manner.

While dividers as described have worked reasonably well, a fixed divider is not optimally suited for all crop conditions or for all crop varieties. For example, difficulties can be encountered when harvesting lodged or down corn crops, and when harvesting different corn varieties having different corncob positions. A taller divider may provide better results for tall standing crops, while a lower, shorter divider may provide improved results for lodged or damaged crop stands. While known corn head divider constructions can be raised and lowered overall, and compacted for facilitating transport, it has not been known to provide height adjustable row unit dividers.

What is needed in the art is an adjustable divider that can be increased or decreased in height as best suited for the crop conditions presented.

SUMMARY OF THE INVENTION

The present invention provides a corn head divider having an extendable and retractable height configuration so that the overall height of a forward portion of the divider can be increased or decreased as required and desired for improved harvesting performance.

The invention in one form is directed to a corn head assembly for a combine harvester, in which the corn head assembly has a frame for mounting to a combine, a plurality of row units extending from the frame for receiving and processing corn stalks in a row and an adjustable divider between adjacent row units for directing corn stalks toward the row units. The adjustable divider has an adjustable divider point including a bottom frame and a top shield held to the bottom frame by an adjustable connection. The top shield is movable by the adjustable connection between a lower most position and an uppermost position relative to the bottom frame.

An advantage of the present corn head divider is that it is height adjustable for improved performance in lodged or damaged crop stands as well as in clean, upwardly standing crop stands.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "non-grain" and "residue" are used principally throughout this specification for convenience but it is to be understood that these terms are not intended to be limiting. Thus "grain" refers to that part of the crop material which is threshed and separated from the discardable part of the crop material, which is referred to as non-grain crop material. Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
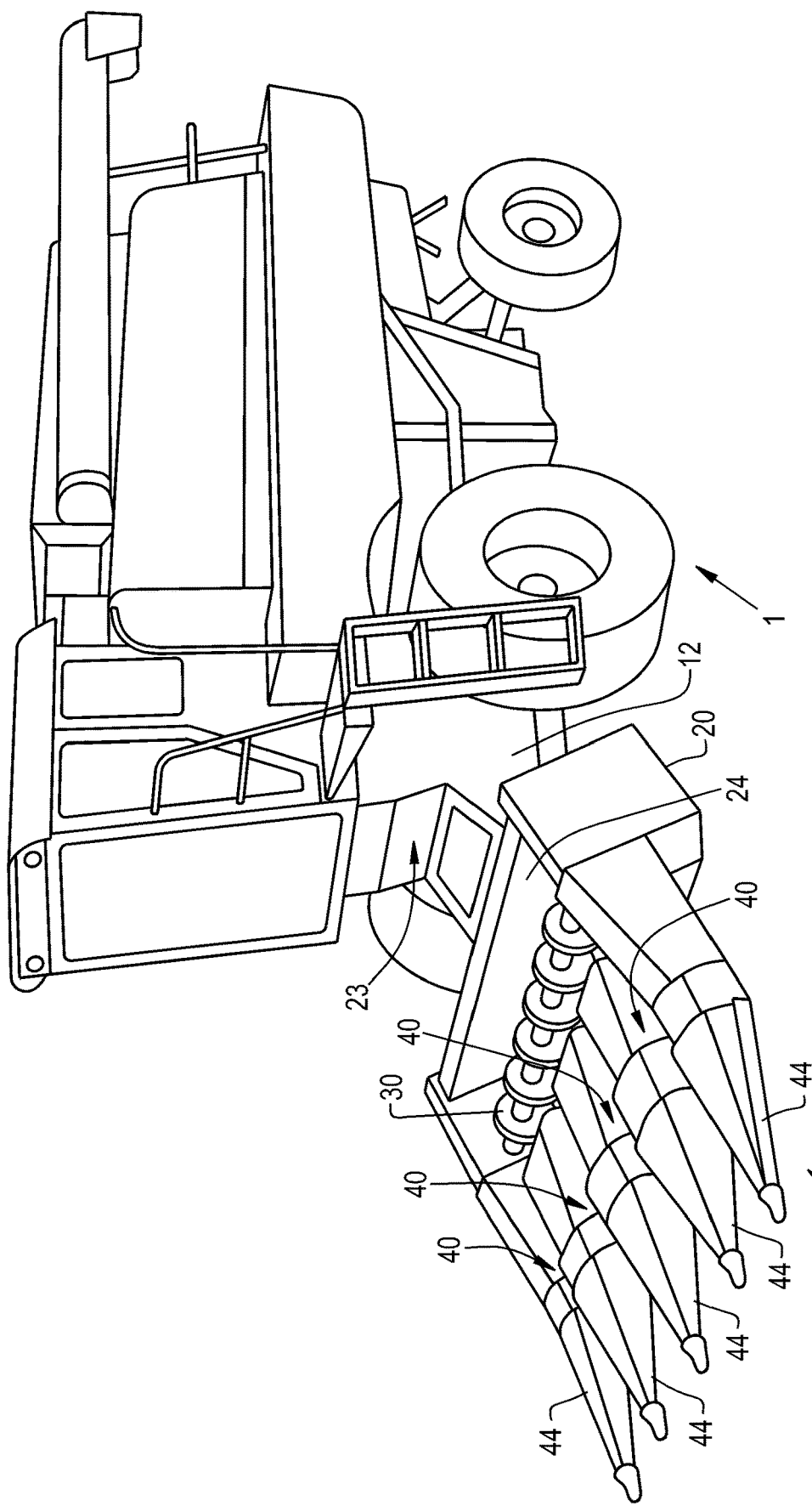
FIG. 1 is a perspective view of an agricultural harvester including a corn head assembly having adjustable dividers according to an embodiment disclosed herein.

Referring now to the drawings more specifically, FIG. 1 shows a corn head assembly 10 on an agricultural combine harvester 1. Corn head assembly 10 is operatively connected to agricultural combine harvester 1 for harvesting corn and feeding the corn to a feeder housing 12. Corn head assembly 10 further receives and processes corn residue which may be knocked down, trampled, cut, chopped, or the like and expelled beneath or behind combine harvester 1. Harvesting operations performed by combine harvester 1 are well known in the art, and a further detailed description of the structures, functions and operation of components of combine harvester 1 is not necessary for a complete understanding of the adjustable corn head divider point described herein.

Corn head assembly 10 includes a frame 20 for mounting to a forward end of combine harvester 1, a conveyor 30 which may be an auger extending across frame 20 for conveying crop material to a combine feeding location 23 at feeder housing 12. A plurality of row units 40 extend forwardly from frame 20. Each row unit 40 is oriented and positioned to engage a flow of crop material, such as corn stalks in rows, during harvesting operations.

Figure 2:
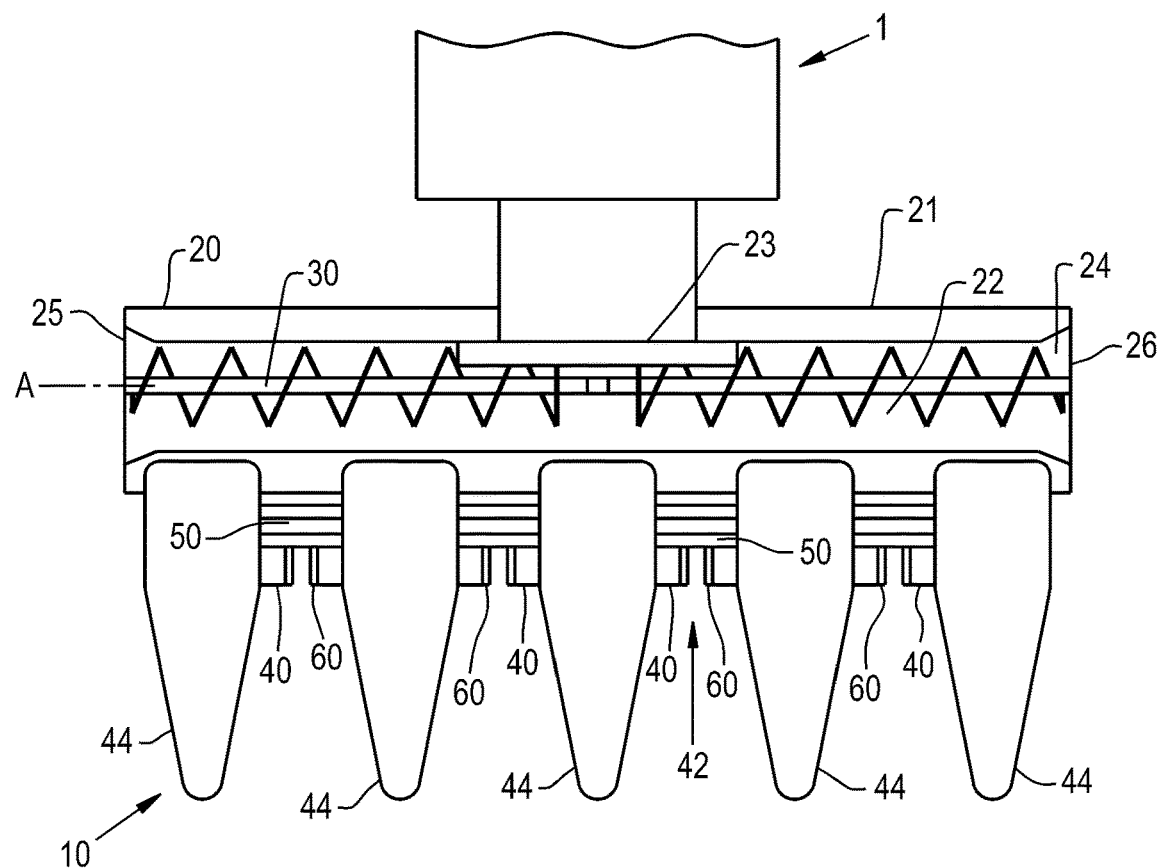
FIG. 2 is a top plan view of the corn head assembly shown in FIG. 1.
Figure 3:
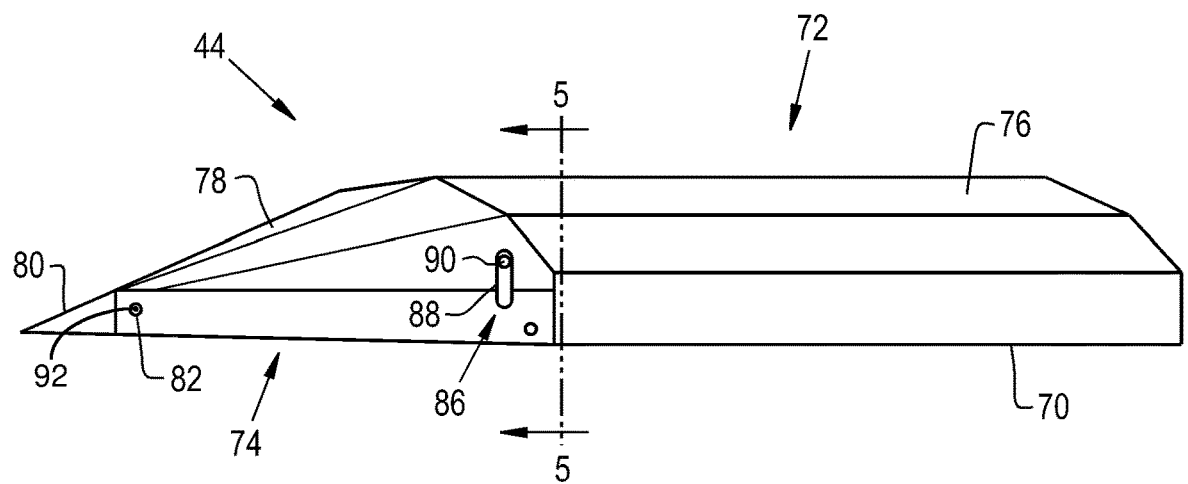
FIG. 3 is a perspective view of the adjustable corn head divider in a first position.

Frame 20 can be configured in any shape suitable for its intended use, and in the exemplary embodiment is substantially rectangular. Referring now to FIGS. 1 and 2, Frame 20 includes a rear wall 21, a bottom 22 and a pair of opposed, spaced sidewalls 25, 26 on opposite side edges of bottom 22. Frame 20 further includes a channel 24 formed partially by the bottom 22. Conveyor 30 conveys harvested corn along channel 24 to the combine feeding location 23 for feeder housing 12, which is located substantially near a midpoint of channel 24 between sidewalls 25, 26. As shown in the exemplary embodiment, frame 20 can be connected to a forward end of combine harvester 1. Alternatively, frame 20 can be configured for connecting to any device that has use for corn head assembly 10.

Conveyor 30 can be configured as a screw auger conveyor or as a conveyor of any other type suitable and capable of moving grain through channel 24. For example, a paddle system, a conveyor belt or a pressure-based system or combinations thereof also can be used. Such conveyors are known in the art and a further detailed description of the structure, function and operation is not necessary for a complete understanding of the adjustable corn head divider point described herein. As those skilled in the art will understand readily, auger 30 is connected to frame 20 at sidewalls 25, 26 and rotates about an axis A. The opposed halves of auger 30 are configured to convey crop material toward the center of corn head assembly 10, between sidewalls 25, 26.

Corn head assembly 10 includes a plurality of row units 40 spaced there along appropriate distance to receive and process individual rows of corn. Each of the row units 40 is attached to frame 20 and extends in a forward direction from frame 20 and away from combine harvester 1. An adjustable divider 44 extends forward from frame 20 between each adjacent pair of row units 40 as well as at the outsides of the outermost row units 40. Adjustable dividers 44 are connected to the plurality of row units 40 for directing rows of corn stalks toward a catch plate 50 and stripping plates 60 of the row units 40. The general function and operation of dividers together with row units 40 are well known to those skilled in the art and need not be described in further detail for a complete understanding of the adjustable features to be described hereinafter. In operation during harvesting, rows of plants to be harvested are aligned and directed to a gap 42 formed between stripping plates 60. As combine harvester 1 moves along a row or rows of corn plants to harvest the corn therefrom, corn plants are guided toward the gaps 42 where ears of corn are then stripped from the stalks due to the stripping plates 60 and the operation of stalk rollers (not shown) that pull the corn stalks in a downward direction. The stalks remain on the ground, and the ears of corn move rearward and into the frame 20. Conveyor 30 then moves the ears of corn to the center of frame 20, to be fed into combine feeder housing 12 at feed location 23. The configuration and operation of the intake arrangements are typical of a standard combine harvester 1.

Each adjustable divider 44 has an adjustable height profile between a shorter operating height profile and a taller operating height profile so that the height of the divider can be adjusted for different harvesting conditions. Referring now more particularly to FIGS. 3-6, a corn header adjustable divider 44 is shown. Corn head adjustable divider 44 includes a bottom frame 70 extending substantially the length of adjustable divider 44, a main body 72 having a fixed height profile above bottom frame 70 and an adjustable divider point 74 that has a vertically adjustable height profile above bottom frame 70. Main body 72 is a rearward portion of adjustable divider 44, and adjustable divider point 74 is a forward portion of adjustable divider 44.

Main body 72 includes a cover 76 held on bottom frame 70 by suitable means such as bolts, rivets or other fasteners, welding, bonding, or other suitable means. Alternatively, cover 76 and bottom frame 70 can be formed as a single monolithic body such as by metal forming, plastic molding, metal or plastic casting or other suitable means for the material used, which can be metal, plastic or a combination thereof. Accordingly, cover 76 and bottom frame 70 define a fixed height operating profile at the rearward region of adjustable divider 44.

Figure 4:
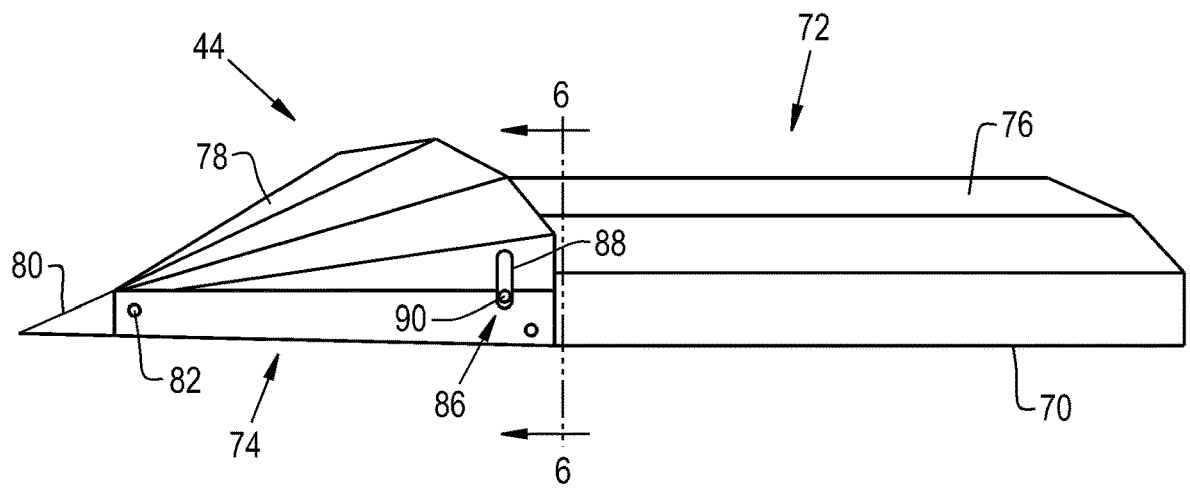
FIG. 4 is a perspective view of the adjustable corn had divider in a second position.
Figure 5:
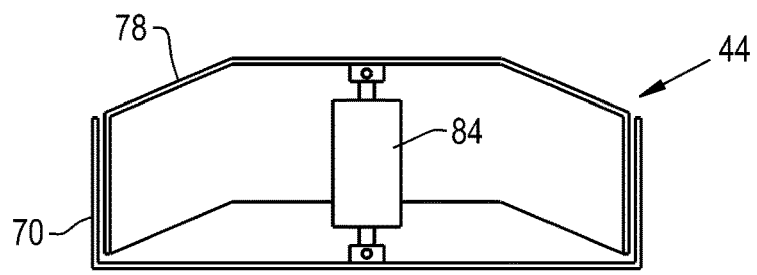
FIG. 5 is a cross-sectional view of the adjustable corn head divider shown in FIG. 3, taken along line 5-5 of FIG. 3.
Figure 6:
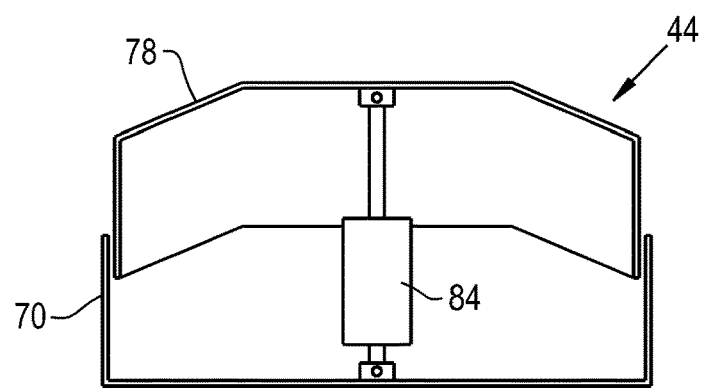
FIG. 6 is a cross-sectional view of the adjustable corn head divider shown in FIG. 4, taken along line 6-6 of FIG. 4.

Adjustable divider point 74 includes a top shield 78 and a leading tip 80. Leading tip 80 extends forwardly from bottom frame 70. Top shield 78 is adjustably connected to bottom frame 70. The adjustable connection of top shield 78 to bottom frame 70 includes a pivotal connection 82 rearward from leading tip 80. Pivotal connection 82 may be a hinge, a rotatable bolt, rod, pin or other suitable structure defining a generally horizontal axis of rotation 92 about which top shield 78 can rotate relative to bottom frame 70, generally near or at the forward end of top shield 78. At the rearward end of top shield 78, the adjustable connection of top shield 78 to bottom frame 70 further includes an extendable and retractable connection 84 between top shield 78 and bottom frame 70. Extendable and retractable connection 84 can be an actuator such as a pneumatic cylinder, a hydraulic cylinder or a stepper motor and appropriate linkage connections, a mechanical adjustment such as a threaded rod, an extendable locking fixture or other suitable structure for securing the position of top shield 78 in a selected vertically adjusted position relative to bottom frame 70. In a lowermost position depicted in FIGS. 3 and 5, top shield 78 is held at the level of cover 76 and forms a smooth, level transition between top shield 78 and cover 76. In the lowermost position of top shield 78, extendable and retractable connection 84 is fully retracted. Extension of extendable and retractable connection 84, as shown in FIG. 6, elevates the rearward end of top shield 78 relative to bottom frame 70, with the forward portion of top shield 78 pivoting about pivotal connection 82. Accordingly, as depicted in FIG. 4, top shield 84 is elevated relative to cover 76.

To stabilize the movement and position of top shield 78 relative to bottom frame 70, one or more stabilizer structure 86 can be provided. In the illustrated embodiment, the stabilizer structure 86 includes a slot 88 in one of bottom frame 70 and top shield 78 and a pin 90 affixed to the other of top shield 78 and bottom frame 70, with pin 90 extending into slot 88. Slot 88 defines a path for the travel of pin 90 between the lowered position of top shield 78 and the uppermost raised position of top shield 78.

The operation of extendable and retractable connection 84 relative to top shield 78 can be such as to place top shield 78 in a limited number of discrete positions, such as a lowermost position and an uppermost position. Alternatively intermediate positions can be defined as fixed steps between the lowermost position and the uppermost position. Still further, extendable and retractable connection 84 can be infinitely adjustable between a fully retracted position corresponding to a lowermost position for top shield 78 and a fully extended position corresponding to an uppermost position for top shield 78, thus making the top shield 78 infinitely adjustable between the lowermost position thereof and the uppermost position thereof.

It should be understood that a single extendable and retractable connection 84 such as a pneumatic or hydraulic actuator can be provided for each adjustable top shield 78, or a single such actuator can be provided to operate several or all of the adjustable top shields 78 by use of an appropriate linkage mechanism between adjacent adjustable dividers 44. Still further, individual actuators for each top shield 78 can be connected for simultaneous operation so that all are adjusted simultaneously. It should be understood further that each extendable and retractable connection 84 can be adjusted by manual input or activation separately, or multiple extendable and retractable connections 84 can be operated simultaneously. Further, the operation of extendable and retractable connections 84 can be incorporated into software control systems utilized for operating combine harvester 1 such that automated changes are made together with other set up and/or control features when using combine harvester 1. Still further, while the extendable and retractable connection 84 has been shown and described connected directly to bottom frame 70, it should be understood that it can be anchored in other ways, to move top shield 78 relative to bottom frame 70.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A corn head assembly for an agricultural harvester, the corn head assembly comprising:
 a frame for mounting to an agricultural harvester;
 a plurality of row units extending from the frame for receiving and processing corn stalks in a row;
 an adjustable divider disposed between adjacent row units for directing corn stalks toward the row units, the adjustable divider including a fixed height main body at a rearward portion thereof, an adjustable divider point at a forward portion thereof, and a bottom frame, the adjustable divider point including a leading tip and a top shield held in adjustable positions above the bottom frame by an adjustable connection of the adjustable divider, the top shield being movable by the adjustable connection between a lowermost position and an uppermost position relative to the bottom frame, the top shield including a forward end adjacent to the leading tip and a rearward end adjacent to the fixed height main body, the adjustable connection including a pivotal connection positioned at the forward end of the top shield; and
 a stabilizer structure for operation of the top shield relative to the bottom frame, the stabilizer structure including a slot in one of the top shield and the bottom frame and a pin extending into the slot from the other of the top shield and the bottom frame.

2. The corn head assembly of claim 1, wherein the adjustable connection includes an extendable and retractable connection at the rearward end of the top shield.

3. The corn head assembly of claim 2, wherein the extendable and retractable connection is a pneumatic cylinder.

4. The corn head assembly of claim 2, wherein the extendable and retractable connection is a hydraulic cylinder.

5. The corn head assembly of claim 2, wherein the extendable and retractable connection is configured for manual operation.

6. The corn head assembly of claim 2, wherein the extendable and retractable connection is connected to the bottom frame.

7. The corn head assembly of claim 1, further comprising a plurality of the adjustable divider, each respective one of the adjustable divider having a respective one of the adjustable divider point including a respective one of the bottom frame and a respective one of the top shield held to the respective one of the bottom frame of the respective one of the adjustable divider by a respective one of the adjustable connection, the respective one of the top shield of the respective one of the adjustable divider being movable by the respective one of the adjustable connection between a respective one of the lowermost position and a respective one of the uppermost position relative to the respective one of the bottom frame.

8. The corn head assembly of claim 7, wherein each respective one of the adjustable divider includes a respective one of the fixed height main body at a respective one of the rearward portion thereof and the respective one of the adjustable divider point at a respective one of the forward portion thereof.

9. The corn head assembly of claim 7, wherein the adjustable connection includes a pneumatic or hydraulic actuator, each respective one of the adjustable divider includes a different one of the pneumatic or hydraulic actuator for operation thereof.

10. The corn head assembly of claim 7, wherein each respective one of the adjustable divider has a respective one of the pivotal connection between the respective one of the bottom frame and the respective one of the top shield thereof.

11. The corn head assembly of claim 1, wherein the adjustable connection is configured for infinite adjustment between the lowermost position and the uppermost position.

12. The corn head assembly of claim 1, wherein the pivotal connection defines a transversely extending axis of rotation positioned at the forward end of the top shield.

13. The corn head assembly of claim 1, wherein the forward end of the top shield is at the front half of the top shield, and the rearward end of the top shield is at the rear half of the top shield.

* * * * *